July 9, 1935.  A. McL. NICOLSON  2,007,211
ELECTRICAL TRANSMISSION AND DIRECTION FINDING SYSTEM
Filed June 2, 1931   2 Sheets-Sheet 1
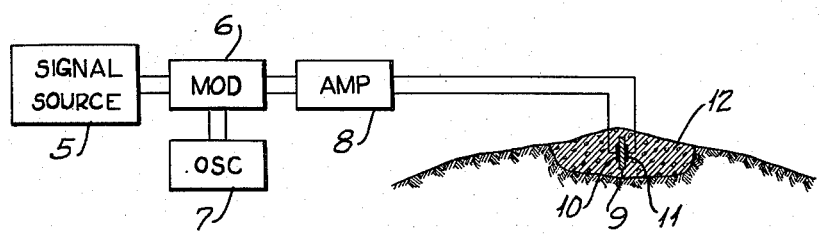
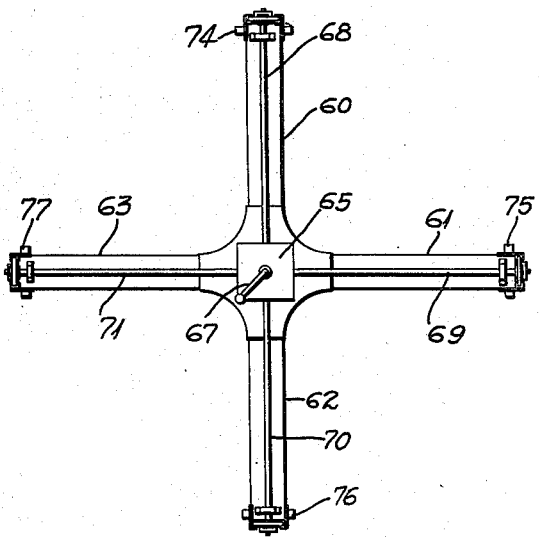
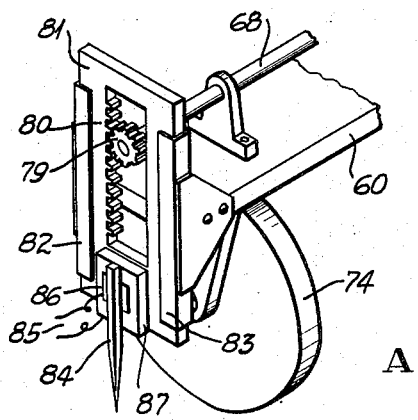
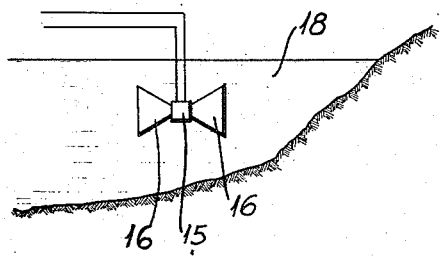
INVENTOR
Alexander McLean Nicolson
BY
ATTORNEY

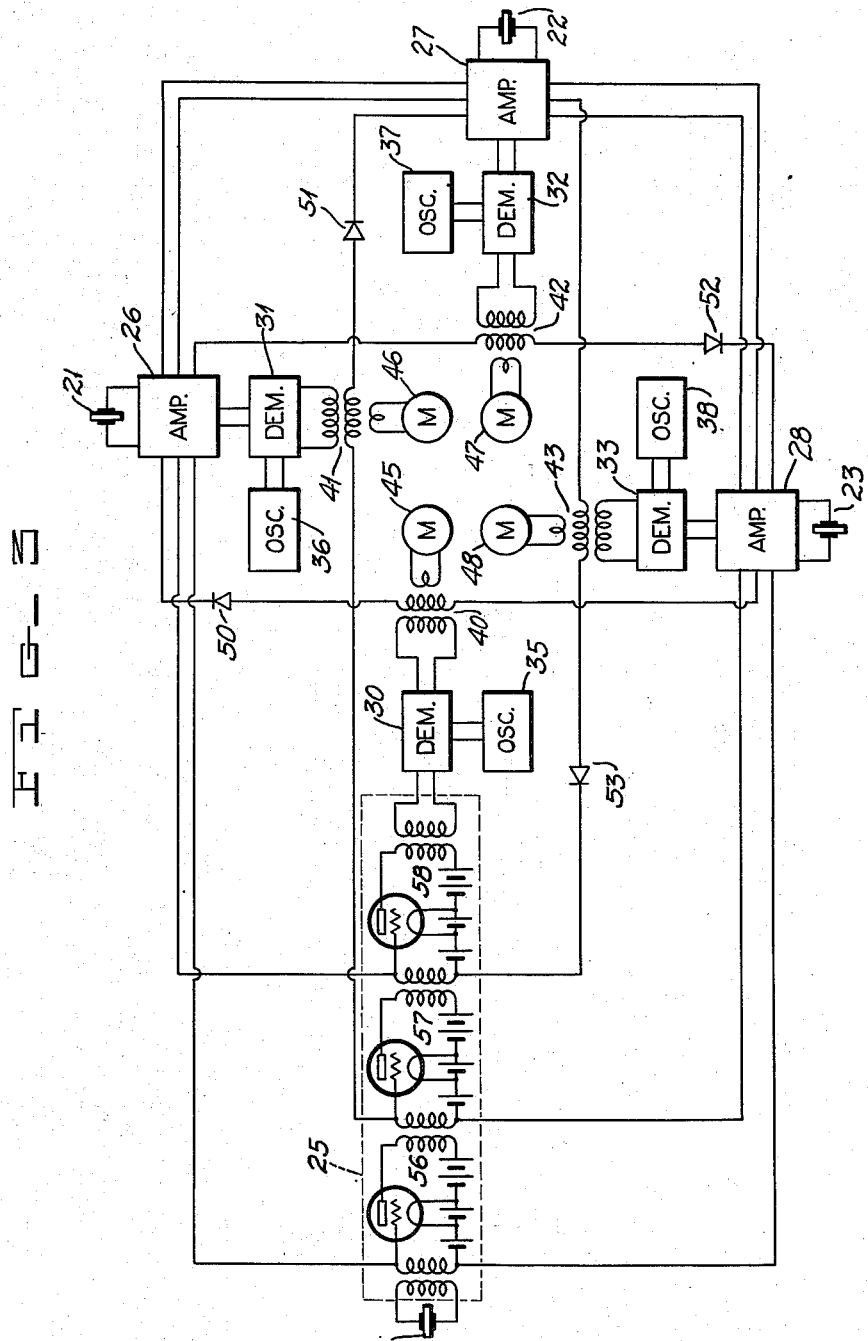

Patented July 9, 1935

2,007,211

UNITED STATES PATENT OFFICE 2,007,211

ELECTRICAL TRANSMISSION AND DIRECTION FINDING SYSTEM

Alexander McLean Nicolson, New York, N. Y., assignor to Communication Patents, Inc., New York, N. Y., a corporation of Delaware Application June 2, 1931, Serial No. 541,571

10 Claims. (Cl. 177—352)

This invention relates to electrical transmission systems, and particularly to such systems for wave transmission in which there is no metallic circuit between the transmitter and receiver.

It is well known in the communication art how electrical signals may be transmitted from point to point by modulating a high frequency carrier wave and propagating it between aerial antennæ. In such transmission systems the waves are generally propagated in all directions through the so-called "ether" with substantially equal intensities unless particular forms of antenna constructions are used to obtain directional effects.

The present invention is related to the above systems to the extent of employing a modulated oscillating system to produce the transmitting wave desired, but it departs from this art by employing different types of antennæ and mediums of transmission.

An object of the invention is to communicate between separated points without interconnecting wire circuits.

Another object of the invention is to transmit electrical signals between separated points by using the earth as the transmitting medium.

A further object of the invention is to detect the directions of signals propagated through the earth as the transmitting medium.

This invention in brief is the provision of a vibrating element buried in a hard portion of the earth's surface or in a crown mat of artificial substance such as concrete, and actuating said element with modulated currents at supersonic frequencies. Such an actuating element may be a piezoelectric crystal element. This crystal element imparts its mechanical vibrations, caused by varying electrical potentials thereon, to the surrounding material for propagation through the earth as compressional waves. The crystal element may be buried in the bottom surface of lakes or seas, or it may be suspended in the water. When used in water, its efficiency is increased by the use of diaphragms attached to the crystal. The transmitted waves through the earth may be detected at points therein having a hard surface crust, or may be detected in artificial mats created for that purpose, while the water detector is positioned in the water similarly to the transmitting element.

The present invention also discloses means with which the direction of these waves may be determined. This detecting device, in brief, employs plural detecting units at different positions on a unitary structure, the units being distinctly separated so that they may be rotated and positioned at will. The first detector to receive the wave operates to suppress the others, so that any reading obtained is shown only at the output of that particular system. Although the detectors are individual and have independent amplification circuits, there is this blocking action which permits the crystal detector first receiving the signal to continue to operate its circuit although the other detectors are thereafter picking up the same signal. The single operating channel thus indicates the direction of the signal.

The invention will be more fully understood by reference to the following description in conjunction with the accompanying drawings, in which:

Fig. 1 is a diagrammatic sketch of a transmitting station;

Fig. 2 shows a propagating device for transmission by water;

Fig. 3 is a schematic circuit of a direction finding receiving system; and

Figs. 4 and 5 are views of the structure for the electrical system of Fig. 3.

Referring specifically to Fig. 1, a signal source 5 which may be either telegraph, telephone or picture currents, supplies a modulator circuit 6 which is also supplied with a high frequency carrier current from an oscillator 7. The modulator output is amplified by an amplifier 8 and supplied to a piezoelectric crystal element 9 having electrodes 10 and 11 buried in the earth. The elements 5, 6, 7, and 8 may comprise standard radio transmission equipment now being employed for commercial communications or by radio broadcast stations.

The crystal element 9 is shown buried in a hard surface portion 12 which may be a natural rock formation, or hard soil formation such as packed clay. It may also be artificially constructed of concrete as a mat placed in a natural depression or excavation made for that purpose. It is preferable that the hard mass extend through the soft top soil layer and be in contact with the denser sub soil. Oscillations produced in the crystal by the varying potentials supplied thereto from the transmitting equipment will cause longitudinal waves in the material 12 which will be propagated therethrough and to the adjoining material on all sides thereof. Should the natural hard substance 12 continue for several miles or more over the earth's surface, transmission will be made between points thereon with small attenuation. However, if the hard crust between two stations is broken by softer material, transmission will still take place, because of the vibrations which will follow through the harder sub-surface layers in contact with the natural hard formation or artificial mat.

Natural directional effects are obtained by the nature of the earth's surface in the neighborhood of the transmitter. For instance, should the transmitting station be located on the edge of a hard crust cap, transmission may be made by means of this cap to stations located thereon much more efficiently than to stations located beyond the cap or to others at positions where softer material intervenes. By controlling the energy input to the transmitting crystal, therefore, certain stations may be selected to receive the signal.

The crystal element 9 in Fig. 1 may be replaced by the crystal assembly 15 in Fig. 2. This crystal assembly comprises the crystal element itself located between two propagating diaphragms 16 immersed in a lake or sea 18, somewhere intermediate the surface and bottom of the water. It is to be understood, of course, that the crystal element may be buried in the earth at the bottom of the water in the same manner as shown in Fig. 1, but transmission may be obtained using the water itself as a transmitting medium with the crystal assembly 15 setting up the transmitting waves.

The invention is not limited solely to crystal antennae, but other mechanical vibrating elements may be employed wherein mechanical motion is obtained by applied voltages. Furthermore, lower frequencies than those used in aerial broadcasting or point to point communication work may be employed without departing from the spirit of this invention.

Referring now to Fig. 3, a receiver for the system of Fig. 1 is shown, which in addition to receiving the signals, also determines the direction of the signals arriving thereat. This system employs a detecting device which is not buried in the earth's crust, but make firm contact therewith, although it is to be understood that the detecting element may be positioned in the earth, as shown in Fig. 1, or in the water, as shown in Fig. 2.

In Fig. 3 crystal detectors 20, 21, 22 and 23 are mounted upon a portable structure, which will be described later, and connected to multi-stage amplifiers 25, 26, 27 and 28, respectively, only the amplifier 25 being shown in full for clearness of explanation. The output of the amplifier is connected to demodulators 30, 31, 32 and 33, which are supplied with demodulating high frequency carrier current from oscillators 35, 36, 37 and 38, respectively. The outputs of the demodulators are transmitted through three-winding transformers 40, 41, 42, and 43 to respective measuring devices 45, 46, 47 and 48 which may comprise amplitude or frequency measuring devices. It is to be noted that each of these circuits comprise an individual system except for the interconnection through three-winding transformers 40, 41, 42 and 43. For instance, the third winding on the transformer 40 is connected in a circuit through a rectifier 50, and through amplifiers 26, 27 and 28; the third winding of the transformer 41 is connected in a circuit through a rectifier 51 and amplifiers 27, 28 and 25; the third winding of transformer 42 is connected in a circuit through a rectifier 52, and amplifiers 28, 25 and 26; while the third winding of transformer 43 is connected through a rectifier 53 and amplifiers 25, 26 and 27.

The amplifier 25 which is duplicated in the other three circuits consists of three stages 56, 57 and 58, having identical characteristics. Each tube is individual to the third windings of the transformers 41, 42 and 43, that is, the amplifier stage 56 is under control of the transformer 42, while amplifier stage 57 is under control of transformer 41, and amplifier stage 58 is under control of transformer 43. The signals in each of these transformers is rectified by their respective rectifiers and produce a bias on the respective amplifier tubes to which they are connected to control the transmission of signals from the crystal detector 20. The exact duplicate arrangement is found in amplifiers 26, 27 and 28, in which an amplifier tube is under the control of the other three detecting circuits.

With the above plural receiving system, any one of the channels may be solely employed for detecting the transmission from the transmitter of Fig. 1, but the present combination of circuits provides a direction finding arrangement which is especially desirable with any type of receiver which receives signals from broadcast stations. It is to be understood that when the carrier is transmitted from the transmitter of Fig. 1, it is unnecessary to use any local generator for the carrier frequency and the ordinary tuned radio frequency receiver will suffice. The circuit shown in Fig. 3 is mounted upon the structure shown in Figs. 4 and 5, it being understood that more arms and detectors may be employed, four being shown in the present embodiment for purposes of simplicity and clearness of explanation.

In Fig. 4 a cross structure has similar arms 60, 61, 62 and 63, upon which is mounted a cabinet 65 which contains the circuits shown in Fig. 3. Of course, it is unnecessary that the circuits be located on the structure, as it may be preferable to have a stationary cabinet containing the receiving apparatus located near the structure for purposes of observation. Passing through the cabinet 65 is a crank 67 which is geared to four similar shafts 68, 69, 70 and 71. Located at the ends of the arms are carrying wheels 74, 75, 76 and 77, upon which the structure may be rotated.

Now referring to the detail sketch in Fig. 5, the shaft 68 terminates in a pinion gear 79 which meshes with a rack 80 formed within a rectangular slidable member 81 which may be raised or lowered vertically in guides 82 and 83. This vertical slider has mounted thereon in any suitable manner, a crystal detector 87, upon which is positioned a stylus member 84 which makes contact with the earth's surface for detecting a sound passing therethrough. Any mechanical vibration of the stylus 84 is transferred to the crystal 87, causing a variation of potential on the electrodes thereon, which is conducted to the amplifier over conductors 85, one electrode being shown at 86. It is a simple matter, therefore, to raise the stylus members of the crystals above the lower rim of the wheels and rotate the structure to any position dsired, and then bring the stylus members in contact with the earth simultaneously. This is accomplished by operating the crank 67.

In the operation of the system for direction finding, it is first necessary to place the stylus member of each crystal into the earth. Assuming that the signal arrives from a direction at the top of the paper, crystal 21 will be actuated prior to crystals 20, 22 and 23, because the wave front reaches crystal 21 before it reaches the others. Immediately upon actuation, the meter 46 will indicate such signal but simultaneously the rectified signal applies a biasing potential to the amplifying stage 57 of each detecting circuit save the circuit of crystal 21 blocking the signal from the meters of the other detector circuits when the wave front actuates the other crystals. By glancing at the meters, therefore, it is at once evident from which direction the signal is being transmitted. Naturally there is an angle within which the signal may be received without positive indication of the direct position of the transmitting station. However, as stated above, if a more accurate determination of the direction is to be obtained, a larger number of detecting devices may be employed, of course, with the present system, several readings may be taken within the 90° angle limits when signals are received intermittently, and the exact direction of transmission determined in this manner. For instance a signal reading may be taken on one meter, then the styluses raised, the apparatus rotated slightly and the styluses again inserted, and a new reading taken. This will continue until the 90° limits are determined and an estimation may be made with a fair degree of accuracy.

In Fig. 3 meters are shown in the output circuits of the four channels illustrated but, of course, these meters may be replaced by a sound or picture reproducing system of any well known type, or may be augmented by such reproducers, depending on the nature of the transmitted signals.

The invention has been described in its preferred embodiments, but it is to be understood that it is to be limited only by the scope of the appended claims.

What is claimed is:

1. In a signal receiving system, means for determining the direction of signals propagated through the earth's crust comprising a plurality of detecting devices having output circuits and arranged in quadrants on the earth's crust, a corresponding plurality of means for amplifying the outputs of said devices a plurality of means for indicating actuation of each of said detecting devices, and means operated by the first detecting device to receive said signals to prevent said other detecting devices from operating their respective indicating means while said first detecting device to receive said signals is receiving said signals.

2. In a direction finding receiving system for broadcast signals propagated through the surface crust of the earth, a plurality of crystal detectors at the boundary of a definite area of the earth's surface and in contact therewith, means for amplifying signals at each of said detectors generated by said crystals, means for indicating the reception of a signal over each of said detectors, and means for interconnecting said amplifying circuits, said interconnecting means disabling the operation of the circuits of the detectors which receive the signals during the reception by the first detector.

3. In a direction finding device, a plurality of means for detecting signals being propagated through the earth positioned at substantially equal distances from a common point, means for indicating the actuation of any of said detecting means, and means operated by the first detecting means to receive said signals to prevent said other detecting means from operating their respective indicating means while said first detecting means to receive said signals is receiving said signals.

4. In a signal detecting device for determining the direction of propagation of a signal, a plurality of detecting means located at substantially equal distances from a common point for detecting said signal, means for indicating when said means are actuated, means for adjusting the position of said detecting means, and means operated by the first detecting means to receive said signal to prevent said other detecting means from operating their respective indicating means while said first detecting means to receive said signal is receiving said signal.

5. The method of determining the direction of propagation of vibrations passing through the earth comprising detecting said vibrations in different quadrants on the earth's surface, determining the quadrant in which the vibrations make their first appearance, and preventing the indication of the detection of said vibrations in other quadrants after the detection thereof in the first quadrant.

6. In a receiving system for broadcast signals which are propagated through the surface portion of the earth, a plurality of detectors enclosing a definite area on the surface of the earth and in contact therewith, each of said detectors generating voltages by vibration, an individual amplifying circuit for each detector, an indicating means connected to each amplifying circuit for indicating detected signals, and means interconnecting each of said amplifying circuits, said means conducting a signal from the first detector circuit to be actuated to the other of said amplifiers for blocking transmission through said other circuits during the operation of said first detector circuit.

7. The method of determining the direction of propagation of vibrations with a plurality of detectors positioned in such order that lines connecting said detectors in series enclose a definite area comprising detecting said vibrations at said positions, determining the position in which the vibrations make their first appearance, and preventing the indication of said vibrations in the other positions during detection thereof in said first position.

8. In a signal detecting device for determining the direction of propagation of a signal, a plurality of detecting means for detecting said signal located in such order that lines connecting said detectors in series enclose a definite area, means for indicating when said means are actuated, and means operated by the first detecting means to receive said signal to prevent said other detecting means from operating their respective indicating means while said first detection means to receive said signal is receiving said signal.

9. A signal detecting device in accordance with claim 8 in which said detecting means comprises a piezo electric crystal.

10. A receiving system in accordance with claim 6 in which said detectors are piezo electric crystals portably and adjustably mounted for making contact at different points on the surface of the earth.

ALEXANDER McLEAN NICOLSON.